(12) United States Patent
Schwarze

(10) Patent No.: US 11,123,798 B2
(45) Date of Patent: Sep. 21, 2021

(54) METHOD FOR MANUFACTURING A SEMI-FINISHED PRODUCT AND A WORKPIECE

(71) Applicant: SLM Solutions Group AG, Luebeck (DE)

(72) Inventor: Dieter Schwarze, Luebeck (DE)

(73) Assignee: SLM Solutions Group AG, Luebeck (DE)

( * ) Notice: Subject to any disclaimer, the term of this patent is extended or adjusted under 35 U.S.C. 154(b) by 192 days.

(21) Appl. No.: 16/189,628

(22) Filed: Nov. 13, 2018

(65) Prior Publication Data
US 2019/0143411 A1 May 16, 2019

(30) Foreign Application Priority Data
Nov. 13, 2017 (DE) .......................... 102017126537.6

(51) Int. Cl.
*B22F 10/20* (2021.01)
*B23K 26/342* (2014.01)
(Continued)

(52) U.S. Cl.
CPC ................ *B22F 10/20* (2021.01); *B22F 1/02* (2013.01); *B29C 64/153* (2017.08); *B29C 64/40* (2017.08);
(Continued)

(58) Field of Classification Search
CPC .. B22F 3/1055; B22F 1/02; B22F 2003/1057; B22F 2003/1058; B22F 2301/205;
(Continued)

(56) References Cited

U.S. PATENT DOCUMENTS

| 5,141,680 A | 8/1992 | Almquist et al. |
| 2016/0107234 A1* | 4/2016 | Craeghs ................ B29C 64/153 419/53 |

(Continued)

FOREIGN PATENT DOCUMENTS

| DE | 102016122312 A1 | 6/2017 |
| EP | 2878402 A1 | 3/2015 |

(Continued)

OTHER PUBLICATIONS

European Patent Office, European Search Report in corresponding Application No. 18204322.4, dated Mar. 25, 2019, 9 pp.
(Continued)

*Primary Examiner* — Rebecca Janssen
(74) *Attorney, Agent, or Firm* — Taft Stettinius & Hollister LLP

(57) ABSTRACT

A method for manufacturing a three-dimensional semi-finished product comprises the steps of applying a first raw material powder to a carrier, applying a second raw material powder to the carrier, selectively irradiating the first raw material powder applied to the carrier with electromagnetic radiation or particle radiation, in order to manufacture a workpiece produced from the first raw material powder on the carrier by a generative layer construction method, and selectively irradiating the second raw material powder applied to the carrier with electromagnetic radiation or particle radiation, in order to manufacture a support element produced from the second raw material powder on the carrier by a generative layer construction method, wherein the support element produced from the second raw material powder has a higher thermal conductivity than the workpiece produced from the first raw material powder and wherein the support element dissipates heat introduced
(Continued)

Figure 1:
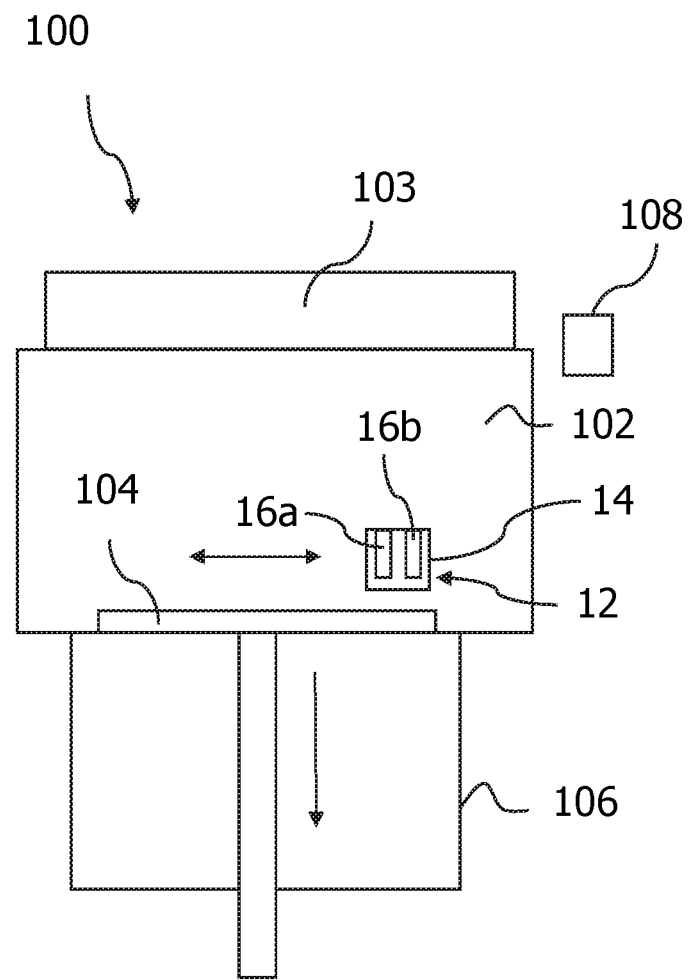

during the irradiation of the first and the second raw material powder.

19 Claims, 2 Drawing Sheets

(51) Int. Cl.
  *B33Y 10/00*   (2015.01)
  *B33Y 70/00*   (2020.01)
  *B33Y 80/00*   (2015.01)
  *B29C 64/153*  (2017.01)
  *B29C 64/40*   (2017.01)
  *B22F 1/02*    (2006.01)
  *B22F 10/30*   (2021.01)
  *B33Y 30/00*   (2015.01)
  *B33Y 40/00*   (2020.01)
  *B33Y 50/02*   (2015.01)

(52) U.S. Cl.
  CPC ......... *B22F 10/30* (2021.01); *B22F 2301/205* (2013.01); *B22F 2302/105* (2013.01); *B23K 26/342* (2015.10); *B33Y 10/00* (2014.12); *B33Y 30/00* (2014.12); *B33Y 40/00* (2014.12); *B33Y 50/02* (2014.12); *B33Y 70/00* (2014.12); *B33Y 80/00* (2014.12)

(58) Field of Classification Search
  CPC . B22F 2302/105; B29C 64/153; B29C 64/40; B23K 26/342; B33Y 10/00; B33Y 30/00; B33Y 40/00; B33Y 50/02; B33Y 70/00; B33Y 80/00; Y02P 10/25
  See application file for complete search history.

(56) References Cited

U.S. PATENT DOCUMENTS

2017/0232671 A1* 8/2017 Fieldman .............. B29C 64/153
                                                           264/497
2019/0351669 A1* 11/2019 Shah ...................... B33Y 70/00

FOREIGN PATENT DOCUMENTS

| EP | 2910362 A1 | 8/2015 | |
| EP | 2961549 A1 | 1/2016 | |
| EP | 3050650 A1 | 8/2016 | |
| WO | 2012131481 A1 | 10/2012 | |
| WO | WO-2016132225 A1 * | 8/2016 | ............ B22F 1/0088 |
| WO | 2017143005 A1 | 8/2017 | |
| WO | WO-2017143005 A1 * | 8/2017 | ............. B28B 1/001 |

OTHER PUBLICATIONS

M.X. Gan et al., "Practical support structures for selective laser melting," Journal of Materials Processing Technology, dated Aug. 6, 2016, 474-484 pp., vol. 238, Elsevier B.V., Amsterdam, Netherlands.

Gonzalez, J.A., et al.; Characterization of Inconel 625 Fabricated Using Powder-Bed-Based Additive Manufacturing Technologies; published by Elsevier B.V.; version of record https://www.sciencedirect.com/science/article/pii/S092401361830373X; copyright 2018, 32 pgs.

* cited by examiner

METHOD FOR MANUFACTURING A SEMI-FINISHED PRODUCT AND A WORKPIECE

The invention relates to a method for manufacturing a three-dimensional semi-finished product by means of a generative layer construction method. The invention further relates to a three-dimensional semi-finished product manufactured by means of a generative layer construction method and a method for manufacturing a three-dimensional workpiece from this semi-finished product.

In generative methods for manufacturing three-dimensional workpieces and in particular in generative layer construction methods it is known to apply an initially shapeless or shape-neutral moulding compound (for example, a raw material powder) in layers to a carrier and to solidify it by site-specific irradiation (e.g. by melting or sintering), in order ultimately to obtain a workpiece of a desired shape. The irradiation may be carried out by means of electromagnetic radiation, for example in the form of laser radiation. In an initial state the moulding compound may be present initially as a granulate, as powder or as a liquid moulding compound and in consequence of the irradiation be selectively or, expressed another way, site-specifically solidified. The moulding compound may comprise ceramic, metal or plastic materials, for example, and also material mixtures of these. One variant of generative layer construction methods relates to so-called powder bed fusion, in which in particular metal and/or ceramic raw material powders are solidified into three-dimensional workpieces.

To produce individual workpiece layers it is further known to apply raw material powder in the form of a raw material powder layer to a carrier and to irradiate the raw material powder layer selectively and according to the geometry of the workpiece layer now to be produced. The laser radiation penetrates the raw material powder and solidifies this, for example as a result of heating, which causes melting or sintering. Once a workpiece layer is solidified, a new layer of unprocessed raw material powder is applied to the workpiece layer already produced. Known coater arrangements or powder coating devices can be used for this. Renewed irradiation then takes place of the now uppermost and as yet unprocessed raw material powder layer. The workpiece is consequently constructed successively layer by layer, wherein each layer defines a cross-sectional face and/or a contour of the workpiece. It is further known in this connection to refer to CAD or comparable workpiece data, in order to manufacture the workpieces substantially automatically. Known devices for manufacturing three-dimensional workpieces are found in EP 2 961 549 A1 and in EP 2 878 402 A1, for example. The devices described in these documents each comprise a carrier, which can be lowered layer by layer downwards in a vertical direction. A corresponding vertical movement of the carrier always takes place in these known devices when a layer of the raw material powder has been completely irradiated and before the next powder layer is applied. It can thus be guaranteed that a focal plane of the irradiation unit is always located in the layer to be solidified (i.e. in the uppermost layer) of the raw material powder.

During the manufacture of a three-dimensional workpiece by means of a generative layer construction method, support elements are usually also constructed layer by layer alongside the workpiece. These support elements serve to dissipate heat introduced into the moulding compound when constructing the individual workpiece layers and thereby prevent overheating and/or warping of the workpiece. Moreover, the support elements fix the workpiece and/or individual workpiece layers relative to the carrier used for construction of the workpiece, whereby the construction of workpiece overhangs or similar, for example, is made possible. Following the completion of the semi-finished product consisting of the workpiece and the support elements, the support elements are normally removed by mechanical machining, such as milling, for example.

Many materials processed into three-dimensional workpieces by a generative layer construction method have a low thermal conductivity. For example, the thermal conductivity of stainless steel is only approx. 20 W/mK. To guarantee adequate heat dissipation via the support elements in the construction of workpieces consisting of such materials, the support elements are of great importance. For example, workpieces with large surfaces and/or thick-walled solid bodies are usually provided with heavily reinforced support elements up to solid support bases.

The object of the invention is to provide an efficient method for manufacturing a three-dimensional semi-finished product by means of a generative layer construction method. The invention is further based on the task of specifying a semi-finished product to be manufactured efficiently by means of a generative layer construction method and a method for manufacturing a three-dimensional workpiece from such a semi-finished product.

In a method for manufacturing a three-dimensional semi-finished product, a first raw material powder is applied to a carrier. Furthermore, a second raw material powder is applied to the carrier. The carrier may have a horizontal surface to which the raw material powder can be applied in layers, i.e. in horizontal layers. The carrier may further be lowered layer by layer in a vertical direction downwards. To apply the first and the second raw material powder to the carrier, a powder coating device may be used, which is movable over the surface of a carrier. The powder coating device may comprise a roller, a slider or another suitable component, which is adapted to travel in a horizontal direction over a surface of the carrier or over a powder layer already applied to the surface of the carrier and in doing so to apply a new powder layer.

The powder coating device is preferably adapted to apply raw material powder layers to the carrier that contain both the first and the second raw material powder. In the method for manufacturing a three-dimensional semi-finished product, the application of the first and the second raw material powder thus takes place preferably site-selectively, i.e. the first raw material powder is applied to regions of the carrier in which a component or a component section is to be constructed from the first raw material powder. In contrast to this, the second raw material powder is applied to regions of the carrier in which a component or a component section is to be constructed from the second raw material powder.

A powder coating device that is suitable for applying powder layers consisting of several materials may comprise separate powder reservoirs, for example, for the first and the second raw material powder. The powder reservoirs may be formed integrated with the component of the powder coating device that is movable over the surface of the carrier and can likewise move over the surface of the carrier in operation of the powder coating device. By suitable control of the powder delivery from the powder reservoirs the first and the second raw material powder can then be applied site-selectively to the carrier.

Alternatively to this, however, the powder coating device may also have fixed powder reservoirs, which are arranged adjacent to the carrier, for example and from which the mobile component of the powder coating device removes powder and distributes it over the surface of the carrier. The mobile part of the powder coating device may comprise a nozzle, for example, which is movable over the carrier in order to apply the first and the second raw material powder site-selectively to the carrier.

The second raw material powder has a higher thermal conductivity than the first raw material powder. A structure manufactured from the second raw material powder accordingly has a higher thermal conductivity than a structure manufactured from the first raw material powder. A structure manufactured from the second raw material powder preferably has a thermal conductivity that is higher approximately at least by a factor of 10, more preferably at least by a factor of 15 and particularly preferably at least by a factor of 20 than the thermal conductivity of a structure manufactured from the first raw material powder.

The first raw material powder applied to the carrier is irradiated selectively, in particular site-selectively, with electromagnetic radiation or particle radiation, in order to manufacture a workpiece produced from the first raw material powder on the carrier by a generative layer construction method. The second raw material powder applied to the carrier is also irradiated selectively, in particular site-selectively, with electromagnetic radiation or particle radiation in order to manufacture a support element produced from the second raw material powder on the carrier by a generative layer construction method. If desired or necessary, even several support elements may be constructed from the second raw material powder in the method for manufacturing a three-dimensional semi-finished product. It is essential only that at least one support element, preferably all support elements of the semi-finished product are produced from the second raw material powder, while the workpiece is constructed from the first raw material powder. The support element produced from the second raw material powder has a higher thermal conductivity than the workpiece produced from the first raw material powder.

An irradiation unit, which is used to irradiate the raw material powder layers applied to the carrier and containing the first and the second raw material powder, may comprise at least one optical element. The optical element may be a scanning unit, a focusing unit and/or an F-Theta lens, for example. The irradiation unit may further comprise a beam source, such as an electron beam source or a laser, for example. The radiation emitted by the irradiation unit may also be supplied to the irradiation unit, however, by a beam source that is located outside of the irradiation unit. For example, mirrors, optical fibres and/or other light conductors can be used for this.

The workpiece and the support element can be produced by means of a single optical element, for example a single scanning unit. Alternatively to this, however, it is also possible to use several optical elements, for example several scanning units, to manufacture the workpiece and the support element. For example, a first scanning unit can be used to construct the workpiece, and a second scanning unit can be used to construct the support element. The scanning process, for example the scanning speed, the beam diameter, the penetration depth of the radiation into the powder and the power of the beam source can then be optimally adapted to the processing properties of the raw material powder.

The processing of the first and the second raw material powder can take place with a substantially identical output of the beam source, i.e. with substantially the same laser output, for example. Alternatively to this, however, it is also conceivable to use different outputs of the beam source, i.e. different laser outputs, for example, to process the first and the second raw material powder. For example, different beam sources, i.e. different lasers with different laser outputs, for example, can be used to process the first and the second raw material powder. In particular, a laser with a higher laser output can be used if necessary to process the second raw material powder with high thermal conductivity.

During the manufacture of the three-dimensional semi-finished product, the support element dissipates heat introduced during irradiation of the first and the second raw material powder. The support element may further be used to fix the workpiece relative to the carrier and to support workpiece overhangs, for example. The higher thermal conductivity of the second raw material powder and of the support element by comparison with the thermal conductivity of the first raw material powder and the workpiece makes a particularly rapid and effective heat dissipation possible, due to which the risk of warping and/or overheating of the workpiece can be reduced. Furthermore, the support element can be designed to be less voluminous, due to which the construction time for the semi-finished product consisting of the workpiece and the support element can be shortened. Finally, a less voluminous support element can be separated from the workpiece more easily, due to which the outlay for post-machining of the semi-finished product can be reduced.

Furthermore, the higher thermal conductivity of the second raw material powder and of the support element produced from it makes it possible for the second raw material powder to be processed at a higher scanning speed, in particular a scanning speed higher by up to the factor of 5, than the first raw material powder without causing damage to the support element produced from the second raw material powder due to inadequate heat dissipation. It is made possible by this that the support element can be constructed at a higher scanning speed than the workpiece, which then reduces the construction time for the semi-finished product in particular when a large-scale and/or voluminous support element is required. In addition or alternatively to this, the higher thermal conductivity of the second raw material powder and of the support element produced from it can be used to increase the scanning speed during processing of the first raw material powder, i.e. the semi-finished product manufactured from the first and the second raw material powder can be constructed at higher scanning speed than a semi-finished product in which both the workpiece and the support element are manufactured from the first raw material powder with lower thermal conductivity.

The workpiece produced from the first raw material powder preferably has a thermal conductivity of approx. 3 to 30 W/mK, more preferably of approx. 5 to 25 W/mK, and especially preferably of approx. 6 to 20 W/mK. A particularly preferred workpiece has a thermal conductivity of approx. 6.5 to 7.5 W/mK, especially preferably of approx. 7 W/mK. The support element produced from the second raw material powder can have a thermal conductivity of maximally approx. 100 to 400 W/mK, more preferably of approx. 120 to 400 W/mK and especially preferably of approx. 130 to 380 W/mK.

In a preferred embodiment of the method for manufacturing a three-dimensional semi-finished product, the workpiece consists of a metal material with a thermal conductivity of maximally approx. 25 W/mK, more preferably of maximally approx. 20 W/mK and especially preferably of maximally approx. 10 W/mK. A particularly preferred workpiece consists of a metal material with a thermal conductivity of approx. 7 W/mK. The support element can consist of a ceramic material with a thermal conductivity of at least approx. 100 W/mK, more preferably of at least approx. 120 W/mK and especially preferably of at least approx. 140 W/mK.

The first raw material powder is preferably a titanium alloy powder, in particular TiAl6V4 powder. The thermal conductivity of a TiAl6V4 workpiece is approx. 7 W/mK. Alternatively to this, however, it is also conceivable to use a steel powder, for example stainless steel powder, as the first raw material powder. The workpiece then has a thermal conductivity of approx. 20 W/mK. The first raw material powder can have different particle sizes and particle size distributions as a function of the desired properties of the workpiece to be manufactured from the first raw material powder. However, the particle size of the first raw material powder is preferably below 100 μm.

The second raw material powder is preferably an SiC powder, in particular an SiC precursor powder. The thermal conductivity of a component of pure SiC is approx. 360 W/mK, the thermal conductivity of a component of technical SiC approx. 100 to 140 W/mK. The thermal conductivity of the support element can accordingly be approx. 100 to 140 w/mK, but if necessary also up to 360 W/mk. Similar to the first raw material powder, the second raw material powder can also have different particle sizes and particle size distributions as a function of the desired properties of the support element to be manufactured from the second raw material powder. However, the particle size of the second raw material powder is preferably also under 100 μm. If this SiC precursor powder is exposed to high temperatures, in particular temperatures that are in the range of the melting temperature of the material of the first raw material powder, the SiC precursor powder sublimates and recrystallises, so that solid structures of SiC and consequently a support element consisting of SiC can be constructed.

In the method for manufacturing a three-dimensional semi-finished product, the carrier may be lowered layer by layer in a vertical direction downwards into a build chamber. A build chamber wall extending substantially vertically then forms a lateral limit for the raw material powder applied to the carrier, so that the completed semi-finished product is finally taken up in the build chamber embedded in raw material powder not consumed, i.e. irradiated, in the manufacture of the semi-finished product. This unconsumed raw material powder is preferably processed and reused. The processing of the raw material powder may comprise, depending on the requirement, various cleaning and/or classification steps to remove impurities and/or coarse articles from the raw material powder.

Following its completion, a semi-finished product manufactured according to the method for manufacturing a three-dimensional semi-finished product is embedded in a raw material powder mixture comprising both particles of the first raw material powder and particles of the second raw material powder. The method for manufacturing a three-dimensional semi-finished product therefore preferably comprises a step for separating the first raw material powder not consumed in the production of the workpiece from the second raw material powder not consumed in the production of the support element. In particular, a density separation method is used to separate the first raw material powder not consumed in the production of the workpiece from the second raw material powder not consumed in the production of the support element.

A density separation method can be used efficiently if sufficient difference exists between the density of the first raw material powder and the density of the second raw material powder. If SiC, which has a specific density of 2.54 g/cm$^3$ and thus a lower specific density than aluminium, is used as the second raw material powder, this material can be separated reliably and efficiently by a density separation process from many metal raw material powders, such as powder from titanium, titanium alloys, iron, ferrous alloys or steel, in particular stainless steel, for example.

For example, the first raw material powder not consumed in the production of the workpiece may be separated from the second raw material powder not consumed in the production of the support element by screening in a fluid. A fast, reliable and automated separation of the raw material powders can be realised by this.

A three-dimensional semi-finished product comprises a workpiece produced from a first raw material powder by selectively irradiating a first raw material powder applied to a carrier with electromagnetic radiation or particle radiation. The semi-finished product further comprises a support element produced from the second raw material powder by selectively irradiating a second raw material powder applied to the carrier with electromagnetic radiation or particle radiation. The support element is adapted to dissipate heat introduced during irradiation of the first and the second raw material powder and/or to fix the workpiece relative to the carrier. The second raw material powder has a higher thermal conductivity than the first raw material powder. The workpiece manufactured from the first raw material powder accordingly has a lower thermal conductivity than the support element manufactured from the second raw material powder.

The workpiece manufactured from the first raw material powder preferably has a thermal conductivity of approx. 5 to 25 W/mK. In addition or alternatively to this, the support element manufactured from the second raw material powder can have a thermal conductivity of approx. 100 to 400 W/mK.

For example, the workpiece manufactured from the first raw material powder may consist of a metal material with a thermal conductivity of maximally 20 W/mK. In addition or alternatively to this, the support element manufactured from the second raw material powder may consist of a ceramic material with a thermal conductivity of at least 100 W/mK.

The first raw material powder and consequently the workpiece preferably consist of a titanium alloy, in particular TiAl6V4. The second raw material powder is preferably an SiC powder, in particular an SiC precursor powder, so that the semi-finished product preferably comprises a support element consisting of SiC.

In a method for manufacturing a three-dimensional workpiece, a three-dimensional semi-finished product is first manufactured according to the method described above. The support element produced from the second raw material powder is then separated from the workpiece produced from the first raw material powder. The separation of the support element from the workpiece take place preferably after the removal of the semi-finished product comprising the workpiece and the support element from the powder bed, which consists of the first and second raw material powder applied to the carrier during production of the semi-finished product but not consumed.

It is generally conceivable to separate the support element from the workpiece by a chemical solution process. However, the separation of the support element produced from the second raw material powder from the workpiece produced from the first raw material powder preferably takes place by a mechanical process. Short process times can be realised by this.

In particular, the support element produced from the second raw material powder may be separated from the workpiece produced from the first raw material powder by a cutting process, such as sawing or milling, for example. Finally, it is conceivable to utilise the material properties of the support element and in particular the brittleness of a ceramic support element for the separation of the support element from the workpiece. For example, a ceramic support element, in particular a support element consisting of SiC, may be separated from the workpiece produced from the first raw material powder by breaking off as a result of a mechanical load or temperature change load. The post-processing outlay on the semi-finished product to separate the support element from the workpiece can be minimised by this.

Figure 2:
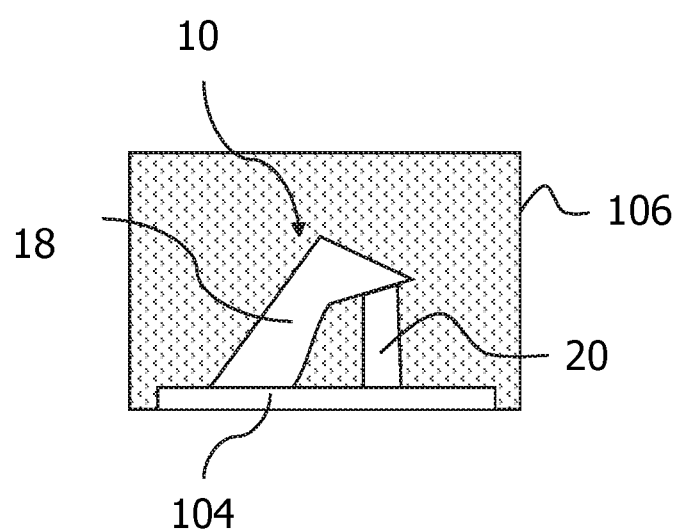

The invention is explained in greater detail below with reference to the enclosed schematic figures. These show:

FIG. 1 a schematic view of a device that executes a method for manufacturing a three-dimensional semi-finished product; and FIG. 2 a three-dimensional semi-finished product, which comprises a workpiece and a support element.

FIG. 1 shows a schematic view of a device 100, which is adapted to execute a method for manufacturing a three-dimensional semi-finished product 10, which is illustrated in FIG. 2. The device 100 comprises a process area 102 and an irradiation set-up 103 arranged above the process area 102. The process area 102 is sealed off against the ambient atmosphere, so that an inert or reaction gas atmosphere or a pressure that is reduced compared with atmospheric pressure can be set if required in the process area 102. Arranged in the process area is a carrier 104, which is used to receive raw material powder and the semi-finished product 10 manufactured from the raw material powder by a generative layer construction method. The carrier 104 is movable relative to the process area 102 in a vertical direction downwards into a build chamber 106.

The irradiation set-up 103 of the device 100 comprises a beam source, preferably a laser source, which emits light, for example, at a wavelength of approximately 1064 nm. Alternatively to this, the beam source (for example, a laser) can also be located outside of the radiation set-up 103 and a beam to be guided over the raw material powder can be supplied to the irradiation set-up 103 by means of an optical fibre, for example. The irradiation set-up 103 further has optical elements, such as a scanning unit, a focusing unit and an F-Theta lens, for example. The scanning unit is adapted to scan the beam over the uppermost layer of raw material powder within a horizontal plane (in x direction and y direction). The focusing unit is adapted to change or adjust a focal position of the beam (in z direction) so that a focal plane of the irradiation set-up 103 is located in the region of the uppermost raw material powder layer, which is irradiated by the irradiation set-up 103. If desired, the irradiation set-up 103 can also comprise several scanning units and if applicable also several beam sources.

The device 100 further comprises a powder coating device 12, which is movable over a surface of the carrier 104 in order to apply the raw material powder provided for the manufacture of a workpiece in layers to the surface of the carrier 104. The powder coating device 12 comprises a slider 14, which moves in operation of the powder coating device 12 in a horizontal direction across the surface of the carrier 104 or across a powder layer already applied to the surface of the carrier 104 and in doing so applies a new powder layer.

The powder coating device 12 is adapted to apply raw material powder layers to the carrier 104, which layers contain both a first raw material powder and a second raw material powder different from the first raw material powder. In particular, the powder coating device 12 is adapted to apply the first and the second raw material powder site-selectively to the carrier 104, i.e. to coat defined first regions of the carrier 104 with the first raw material powder and defined second regions of the carrier 104 that are different from the first regions with the second raw material powder.

To this end the powder coating device 12 shown in FIG. 1 comprises a first and a second powder reservoir 16a, 16b, which are formed integrated with the slider 14 and consequently move together with the slider 14 over the surface of the carrier 104. A first raw material powder is taken up in the first powder reservoir 16a, while a second raw material powder different from the first raw material powder is taken up in the second powder reservoir 16b. The first and the second raw material powder can be applied site-selectively to the carrier by appropriate control of the powder delivery from the powder reservoirs 16a, 16b. Alternatively to this, however, the powder coating device 12 can also comprise fixed powder reservoirs, which are arranged adjacent to the carrier 104, for example, in the process area 102. The powder coating device 12 can comprise a nozzle, for example, which is movable over the carrier 104, in order to apply the first and the second raw material powder site-selectively to the carrier 104.

The second raw material powder taken up in the second powder reservoir 16b has a higher thermal conductivity than the first raw material powder taken up in the first powder reservoir 16a. In particular, the second raw material powder taken up in the second powder reservoir 16b in the exemplary embodiment described here is an SiC precursor powder. A component of pure SiC has a thermal conductivity of 360 W/mK, a component of technical SiC has a thermal conductivity of 100 to 140 W/mK. Alternatively to this, however, another, in particular ceramic precursor powder material can be used, as long as a component manufactured from this material has a thermal conductivity of at least 100 W/mK hat.

In the example shown and described here, the first raw material powder taken up in the first powder reservoir 16a is a titanium alloy power, in particular TiAl6V4 powder. A TiAl6V4 component has a thermal conductivity of only 7 W/mK. If starting out from a thermal conductivity of technical SiC in the case of a component manufactured from the SiC precursor powder, a component manufactured from the second raw material powder accordingly has a thermal conductivity that is higher by up to a factor of 20 than the thermal conductivity of the component manufactured from TiAl6V4 powder. Alternatively to a titanium alloy powder, however, another, in particular metal powder material can be used, for example a stainless steel powder, so that a component manufactured from the powder has a thermal conductivity of maximally 25 W/mK.

The radiation emitted by the irradiation set-up 103 is applied site-selectively to the first raw material powder applied to the carrier 104. The heat input into the first raw material powder caused by this brings about a melting or sintering of the particles of the first raw material powder, due to which a workpiece 18 is constructed layer by layer on the carrier 104 from the first raw material powder. In particular, a region of the carrier 104, onto which the first raw material powder has been applied by the powder coating device 12, is irradiated site-selectively layer by layer to produce the workpiece 18. It is understood that the region or regions of the carrier 104 in which the workpiece 18 is to be constructed from the first raw material powder can vary from layer to layer.

The radiation emitted by the irradiation set-up 103 is also applied site-selectively to the second raw material powder applied to the carrier 104. The heat input into the second raw material powder caused by this brings about, at least when using SiC precursor powder as the second raw material powder, a sublimation and subsequent recrystallisation of the particles of the second raw material powder, due to which a support element 20 is constructed layer by layer on the carrier 104 from the second raw material powder. In particular, a region of the carrier 104 to which the second raw material powder has been applied by means of the powder coating device 12 is irradiated site-selectively layer by layer in order to produce the support element 20. It is understood that the region or regions of the carrier 104 in which the support element 20 is to be constructed from the second raw material powder can vary from layer to layer. If desirable or necessary, even several support elements 20 can be constructed from the second raw material powder. It is only essential that at least one support element 20, preferably all support elements 20 of the semi-finished product 10 are manufactured from the second raw material powder, while the workpiece 18 is constructed from the first raw material powder.

During the manufacture of the three-dimensional semi-finished product 10, the support element 20 dissipates the heat introduced during irradiation of the first and the second raw material powder. The support element 20 serves further to fix the workpiece 18 relative to the carrier 104 and, as is clear from FIG. 2, to support a workpiece overhang. The higher thermal conductivity of the second raw material powder and of the support element 20 compared with the thermal conductivity of the first raw material powder and the workpiece 18 permits a particularly rapid and effective heat dissipation, due to which the risk of warpage and/or of overheating both of the support element 20 and of the workpiece 18 can be reduced.

The operation of the device 100 is controlled by a control unit 108. In particular, the control unit 108 controls the operation of the powder coating device 12 and the irradiation set-up 103. For example, the control unit 108 controls the operation of the irradiation set-up 103 so that the scanning process, in particular the scanning speed, the beam diameter, the penetration depth of the radiation into the powder and the output of the beam source, varies as a function of the raw material powder and is adapted to the processing properties of the first and the second raw material powder.

The processing of the first and the second raw material powder can generally take place under the control of the control unit 108 with a substantially identical output of the beam source, i.e. at a substantially identical laser output, for example. Alternatively to this, however, it is also conceivable to use different outputs of the beam source for processing the first and the second raw material powder, i.e. different laser outputs, for example. For example, different beam sources can be used to process the first and the second raw material powder, i.e. different lasers with different laser outputs, for example. In particular, a laser with a higher laser output can be used if necessary to process the second raw material powder with a higher thermal conductivity.

Furthermore, the higher thermal conductivity of the second raw material powder makes it possible that the second raw material powder can be processed at a higher scanning speed, in particular a scanning speed that is higher by up to the factor 5, than the first raw material powder without causing damage to the support element 20 manufactured from the second raw material powder due to inadequate heat dissipation. Due to this the support element can be constructed under the control of the control unit 108 at a higher scanning speed than the workpiece 18. In addition or alternatively to this, the higher thermal conductivity of the second raw material powder can be used to increase the scanning speed during processing of the first raw material powder, i.e. the semi-finished product 10 manufactured from the first and the second raw material powder can be constructed under the control of the control unit 108 at a higher scanning speed than a semi-finished product in which both the workpiece and the support element are manufactured from the first raw material powder with a lower thermal conductivity.

As is evident from FIG. 2, the completed semi-finished product 10 is finally taken up—embedded in a raw material powder mixture that was not consumed, i.e. irradiated during the manufacture of the semi-finished product 10 and that contains both particles of the first raw material powder and particles of the second raw material powder—in the build chamber 106.

In order to be able to sensibly condition and reuse the unconsumed first and second raw material powder, the semi-finished product 10 is removed from the build chamber 106 and the raw material powder mixture contained in the build chamber 106 is subjected to a step to separate the first raw material powder not consumed in production of the workpiece 18 from the second raw material powder not consumed in the production of the support element 20.

If SiC, which has a specific density of 2.54 g/cm$^3$ and thus a lower specific density than aluminium, is used as the second raw material powder, this material can be separated reliably and efficiently by a density separation process from many metal first raw material powders, such as, for example, powder from titanium, titanium alloys, in particular TiAl6V4, iron, ferrous alloys or steel, in particular stainless steel. In the example shown and described here, the first raw material powder not consumed in the production of the workpiece 18 is separated from the second raw material powder not consumed in the production of the support element 20 by screening in a fluid.

The three-dimensional semi-finished product 10 removed from the build chamber 106 comprises the workpiece 18 produced from a first raw material powder by selective irradiation of the first raw material powder applied to the carrier 104 by electromagnetic radiation or particle radiation and the support element 20 produced from the second raw material powder by selective irradiation of the second raw material applied to the carrier 104 by electromagnetic radiation or particle radiation. The workpiece 18 manufactured from the first raw material powder has a lower thermal conductivity than the support element 20 manufactured from the second raw material powder. In particular, in the exemplary embodiment described here, the workpiece 18 produced from TiAl6V4 powder and consequently consisting of TiAl6V4 has a thermal conductivity of just 7 W/m, while the support element 20 produced from SiC precursor powder and therefore consisting of SiC has a thermal conductivity of at least 100 to 140 W/mK and if necessary up to 360 W/mK.

To manufacture a three-dimensional workpiece 18, following the completion of the semi-finished product 10 shown in FIG. 2 and following removal of the semi-finished product 10 from the build chamber 106, the support element 20 produced from the second raw material powder is separated from the workpiece 18 produced from the first raw material powder. The separation of the support element 20 from the workpiece 18 can take place by a cutting process, such as sawing or milling, for example. However, it is also possible to utilise the brittleness of the ceramic support element 20 for separation of the support element 20 from a workpiece 18 consisting of a ductile metal material. In particular, the support element 20 can be separated from the workpiece 18 produced from the first raw material powder by breaking off as a result of a mechanical load or a temperature change load.

REFERENCE SYMBOL LIST

Semi-finished product 10
Powder coating device 12
Slider 14
First powder reservoir 16*a*
Second powder reservoir 16*b*
Workpiece 18
Support element 20
Device for manufacturing a three-dimensional semi-finished product 100
Process area 102
Irradiation set-up 103
Carrier 104
Build chamber 106
Control unit 108

The invention claimed is:

1. A method for manufacturing a three-dimensional semi-finished product with the steps:
applying a first raw material powder to a carrier,
applying a second raw material powder to the carrier,
selectively irradiating the first raw material powder applied to the carrier with electromagnetic radiation or particle radiation, in order to manufacture on the carrier a workpiece produced from the first raw material powder by a generative layer construction method, and
selectively irradiating the second raw material powder applied to the carrier with electromagnetic radiation or particle radiation, in order to manufacture on the carrier a support element produced from the second raw material powder by a generative layer construction method,
wherein the workpiece produced from the first raw material powder has a thermal conductivity of approx. 5 to 25 W/mK,
wherein the support element produced from the second raw material powder consists of a ceramic material with a thermal conductivity of at least 100 W/mK, and
wherein the support element dissipates heat introduced during irradiation of the first and the second raw material powder.

2. The method according to claim 1, wherein the support element produced from the second raw material powder has a thermal conductivity of approx. 100 to 400 W/mK.

3. The method according to claim 1, wherein the workpiece consists of a metal material with a thermal conductivity of maximally 20 W/mK.

4. The method according to claim 1, wherein the first raw material powder is a titanium alloy powder.

5. The method according to claim 1, wherein the second raw material powder is an SiC powder.

6. The method according to claim 1, wherein first raw material powder not consumed during the production of the workpiece is separated from second raw material powder not consumed during the production of the support element by a density separation process.

7. The method according to claim 6, wherein the first raw material powder not consumed in the production of the workpiece is separated from the second raw material powder not consumed in the production of the support element by screening in a fluid.

8. A three-dimensional semi-finished product, comprising:
a workpiece produced from a first raw material powder by selectively irradiating a first raw material powder applied to a carrier with electromagnetic radiation or particle radiation, and
a support element produced from a second raw material powder by selectively irradiating the second raw material powder applied to the carrier with electromagnetic radiation or particle radiation, which support element is adapted to dissipate heat introduced during irradiation of the first and the second raw material powder and/or to fix the workpiece relative to the carrier,
wherein the support element has a higher thermal conductivity than the workpiece,
wherein the workpiece has a thermal conductivity of approx. 5 to 25 W/mK, and
wherein the support element consists of a ceramic material with a thermal conductivity of at least 100 W/mK.

9. The three-dimensional semi-finished product according to claim 8, wherein the support element has a thermal conductivity of approx. 100 to 400 W/mK.

10. The three-dimensional semi-finished product according to claim 8, wherein the workpiece consists of a metal material with a thermal conductivity of maximally 20 W/mK.

11. The three-dimensional semi-finished product according to claim 8, wherein the workpiece consists of a titanium alloy.

12. The three-dimensional semi-finished product according to claim 8, wherein the support element consists of SiC.

13. A method for manufacturing a three-dimensional workpiece with the steps:
manufacturing a three-dimensional semi-finished product according to the method according to claim 1, and
separating the support element produced from the second raw material powder from the workpiece produced from the first raw material powder.

14. The method according to claim 13, wherein the separation of the support element produced from the second raw material powder from the workpiece produced from the first raw material powder takes place by a mechanical method.

15. The method according to claim 13, wherein the support element produced from the second raw material powder is separated from the workpiece produced from the first raw material powder by a cutting process by breaking off as a result of a mechanical load or a temperature change load.

16. The method according to claim 13, wherein the support element produced from the second raw material powder is separated from the workpiece produced from the first raw material powder.

17. The three-dimensional semi-finished product according to claim 8, wherein the workpiece includes layers of irradiated, solidified first raw material powder.

18. The three-dimensional semi-finished product according to claim 8, wherein the support element includes layers of irradiated, solidified second raw material powder.

19. The three-dimensional semi-finished product according to claim 8, wherein the workpiece includes layers of irradiated, solidified first raw material powder and the support element includes layers of irradiated, solidified second raw material powder.

* * * * *